United States Patent [19]

Hanse et al.

[11] Patent Number: 4,751,718
[45] Date of Patent: Jun. 14, 1988

[54] DITHER SUSPENSION MECHANISM FOR A RING LASER ANGULAR RATE SENSOR

[75] Inventors: Joel G. Hanse, Edina; Joseph E. Killpatrick, Minneapolis, both of Minn.

[73] Assignee: Honeywell Inc., Minneapolis, Minn.

[21] Appl. No.: 733,278

[22] Filed: May 10, 1985

[51] Int. Cl.⁴ ............................................. H01S 3/083
[52] U.S. Cl. ...................................... 372/94; 356/350
[58] Field of Search ......................... 372/94, 98, 103; 356/350

[56] References Cited

U.S. PATENT DOCUMENTS

| | | | |
|---|---|---|---|
| 4,115,004 | 9/1978 | Hutchings et al. | 356/350 |
| 4,309,107 | 1/1982 | McNair et al. | 356/350 |
| 4,321,557 | 3/1982 | McNair | 356/350 |
| 4,349,183 | 9/1982 | Wirt | 356/350 |
| 4,411,527 | 10/1983 | Gamertsfelder et al. | 356/350 |
| 4,436,423 | 3/1984 | Kumar et al. | 356/350 |
| 4,534,648 | 8/1985 | Gangialosi | 356/350 |

Primary Examiner—Leon Scott, Jr.
Attorney, Agent, or Firm—Robert A. Pajak

[57] ABSTRACT

A pair of flexure plates having an outer toroidal rim extended from a hub by a plurality of radial springs are utilized to rigidly sandwich a laser block. A housing having an aperture for receiving the sandwiched assembly is welded to the outer toroidal rims to provide a dither suspension mechanism for a ring laser angular rate sensor.

9 Claims, 1 Drawing Sheet

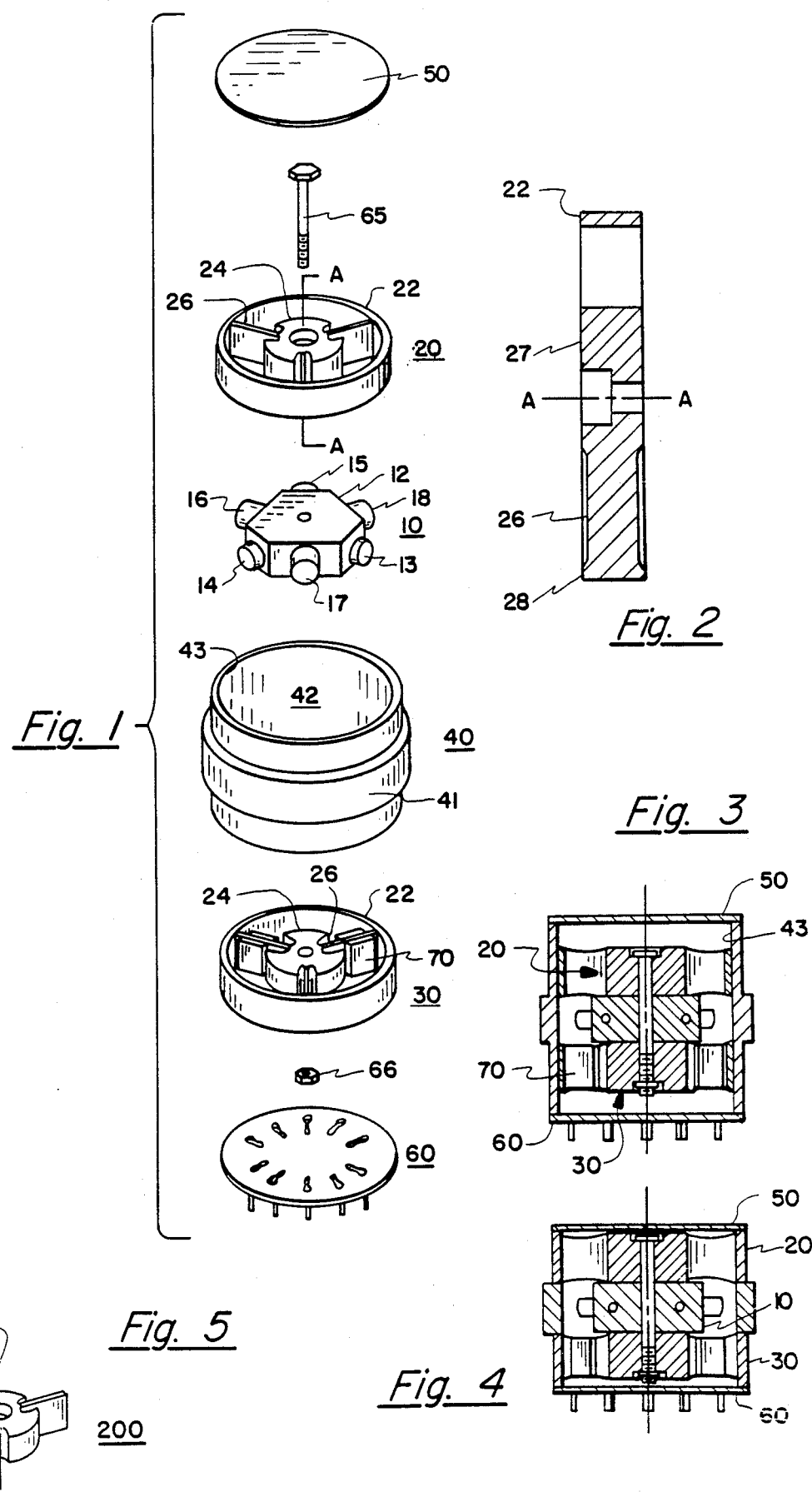

DITHER SUSPENSION MECHANISM FOR A RING LASER ANGULAR RATE SENSOR

FIELD OF THE INVENTION

The present invention relates to ring laser angular rate sensors, and more particularly to ring laser angular rate sensor suspension mechanisms for generating dither motion.

BACKGROUND OF THE INVENTION

Ring laser angular rate sensors are well known and exemplified by U.S. Pat. Nos. 3,323,411 and 3,373,650 issued to Killpatrick, which are incorporated herein by reference thereto. Present day ring laser angular rate sensors generally include a thermally and mechanically stable laser block having a plurality of formed cavities for enclosing a gas. Mirrors are placed at the extremeties of the cavities for reflecting laser beams and providing an optical close-loop path.

Associated with such sensors in a phenomenon called lock-in which has been recognized for some time in the prior art and has been solved by rotationally oscillating the sensor (dither). The means for accomplishing the dither conventionally includes a piezoelectric actuator connected to a suspension system which causes the block of the sensor to oscillate angularly at the natural mechanical resonant frequency of the suspension system. The dither motion is superimposed upon the actual rotation of the sensor in inertial space. The prior art includes various approaches to recover inertial rotation data free from dither and this is not form part of the present invention.

Dither suspension mechanisms in the prior art include those shown, by way of example, in U.S. Pat. Nos. 4,312,557 issued to McNair, 4,411,527 issued to Gamertsfelder et al, and 4,436,423 issued to Kumer et al.

Advances in the art of ring laser angular rate sensors have now made it possible to provide laser sensors having a laser block in the order of 1 inch square. Reduction of the size of the sensor has many advantages including lower cost and lower weight. Dither suspension systems of the prior art do not lend themselves well to small sensor blocks. This is so since the dither mechanism would have to be reduced in size, which generally causes the dither mechanism cost to increase. Further, many dither mechanisms require a large aperture in the laser block for receiving the dither mechanism, and securing the mechanism to the inner wall of the block created by the aperture.

In is an object of the present invention to provide a low cost dither suspension mechanism for ring laser angular rate sensors which is simple to build resulting in low cost.

BRIEF DESCRIPTION OF THE INVENTION

The dither suspension mechanism of the present invention utilizes a pair of flexure plates including an outer toroidal rim and an inner hub coupled together by webs acting as springs. A housing forms, in part, the dither suspension mechanism. The housing has an annular aperture sufficiently sized to receive the combination of a laser block ridgedly secured together between the inner hubs of the flexure plates. The sandwich of the two flexure plates and laser block is inserted into the housing aperture. The outer toroidal rims of the flexure plates are ridgedly secured to the annular inner wall of the aperture in the housing.

BRIEF DESCRIPTION OF THE DRAWINGS

FIG. 1 is an exploded view showing a ring laser angular rate sensor and the dither suspension mechanism.

FIG. 2 is a cross section of a flexure plate.

FIG. 3 is a cross section of a dither suspension mechanism and laser sensor assembly.

FIG. 4 is a cross section of another dither suspension mechanism and laser block assembly.

FIG. 5 shows an alternate flexure plate construction.

DETAILED DESCRIPTION OF THE DRAWINGS

Referring now to the drawings, FIG. 1 shows a ring laser angular rate sensor 10 including a laser block 12. An example of a laser sensor and laser block are shown in U.S. Pat. Nos. 3,390,606 issued to Podgorski and 3,467,472 issued to Kilpatrick, both of which are incorporated herein by reference thereto. Laser block 12 is illustrated as having a triangular optical closed-loop path including mirrors 13, 14, and 15, and electrodes 16, 17, and 18. Also shown in FIG. 1 are flexure plates 20 and 30, a housing 40, a cover 50, header plate 60, threaded stud 65 and hex nut 66.

Flexure plates 20 and 30 each include a toroidal rim 22, a central member 24, and three springs 26. Spring 26 are shown as webs. The central member acts as a hub. As illustrated in FIG. 2, the webs are contoured so as to be somewhat recessed from the outer srufaces 27 and 28 of rim 22 and central member 24. FIGS. 1 and 2 show both the central member and the rin being of equal width, but may be contoured or shaped otherwise to reduce cost and weight, and perhaps the spring constant of the system (i.e. the resonant frequency). The flexure plates are preferrably of unitary construction using a suitable material such as metal.

Laser block 12 includes an aperture through the block in parallel with the sensor axis. Further, flexure plates each include an aperture concentric with its central axis. The apertures of flexure plates 20 and 30, and laser block 12 allow a threaded stud 65 to pass therethrough.

Housing 40 is preferrably constructed from a material suitable for being welded to flexure plates 20 and 30. Housing 40 includes an annular aperture 42 being bounded by an inner wall 43 of curvature radius slighlty greater than the outer portion of the toroidal rim 22 of flexure plates 20 and 30. In the preferred embodiment of the invention, the height of the housing is substantially equal to the sum of the widths of the two toroidal rims of flexure plates 20 and 30 and the width of block 12 as diagramatically illustrated in the simplified cross-section drawing of FIG. 3. Housing 40 also inlcudes a toroidal shaped flange 41 for mounting in an inertial sensor package.

In FIG. 3 stud 65 in combination with hex nut 66 ridgedly secures together block 12 between the hubs or central members 24 of each of the flexure plates. The external surface of toroidal rims 22 of flexure plates 20 and 30 are ridgedly secured to the annular inner wall of housing 40 by welding, for example by laer welding, and the like. Secured to the top and bottom part of the housing are cover 50 and header plate 60. Cover 50 and header plate 60 may be secured to the housing 40 by a variety of techniques including welding the parts together, threading the parts together, and the like.

Header plate 60 includes electrical pins for connections to the gas electrodes and the laser sensor readout assembly of laser 10 (not shown).

As illustrated in FIGS. 1 and 3, flexure plate 30 includes piezoelectric devices 70 attached to springs 26 for electro mechanically flexing the springs 26 to cause flexing in a circumferential direction so as to be capable of oscillating the gyro block 12 relative to the housing 40. Application of piezoelectric devices attached to springs 26 for obtaining the intended function is well known in the art.

An alternate arrangement within the scope of the present invention is illustrated in FIG. 4. In FIG. 4, the toroidal rim of flexure plates 20 and 30 are welded to the top and bottom surfaces of housing 40. As before, the arrangement illustrated in FIG. 4 provides a dither suspension mechanism to obtain the intended function of oscillating the block relative to the housing. While the arrangement shown in FIGS. 1, 2 and 3 contemplates welding the outer toroidal rim to the housing, it should be understood that use of threaded members could accomplish the same intended function of ridgedly securing the toroidal rims to the housing. Specifically, aperture 42 of housing 40 could be threaded to receive a threaded toroidal rim internally. Alternatively, the toroidal rim could have a threaded extension for being threaded on the external surface of the housing.

Shown in FIG. 5 is an alternate arrangement for either of flexure plates 20 and 30. In FIG. 5, flexure plate 200 is essentially that of flexure plate 20 in FIG. 1 except for the elimination of the toroidal rim. Flexure plate 200 includes a central member 224 and springs 226 having first and second ends 230 and 231. The first ends of each of the springs 226 extend from central member 24 acting as spokes to a hub. Preferably, the second ends 231 radially extend away from central member 24 have an outside radius of curvature so as to accomodate the annular inner wall radius of housing 40 to allow a welding operation between the second ends of the springs and the housing.

Flexure plate 200 shown in FIG. 5 may likewise be used for flexure plate 30 in which piezoelectric devices 70 are mounted in a similar manner as shown in FIG. 1. Advantages of flexure plate 200 include lower overall weight and additional mechanical mounting opportunities. For example, housing 40 could be slotted to match the radial extensions of springs 226 to aid in the assembly operation.

Although the preferred embodiment illustrated in FIG. 1 shows two flexure plates securing together laser block 12, only flexure plate 30 is required. That is, only a single flexure plate having the piezoelectric devices bending the springs to cause motion in a circumferential direction is necessary in performing the intended function.

It should be understood that the invention is not limited to the exact details of construction shown and described herein for obvious modifications will occur to persons skilled in the art, and particularly those skilled in the art of mechanical assembly.

Although the embodiments of the invention illustrated in the accompanying figures show a triangular laser block, the invention is not limited thereto. Laser block 12 merely serves as a driven member and the dither suspension mechanism can be used to transmit circumferential motion to the driven member. Specifically in the art of laser sensors, the driven member could also be a rectangular laser sensor as well as a cube laser sensor (three laser sensors in one block), and the like.

The embodiments of the invention in which an exclusive property or right is claimed are defined as follows:

1. In a laser angular rate sensor having a laser block driven about an axis by a dither suspension mechanism, the dither suspension mechanism comprising:
   a first flexure plate having a central axis, said first flexure plate having,
      a central member, and
      a first plurality of spring members having first and second ends, each of said first plurality of spring members extending from said central member with said first ends of said spring members rigidly fixed to said central member;
   a housing having an aperture for receiving said laser block, said housing aperture being bounded by an annular inner wall about a central axis therethrough, said aperture capable of receiving said laser block and said first flexure plate;
   means for rigidly securing together said laser block and said central member of said first flexure plate; and
   means for rigidly securing said second ends of said first plurality of spring members to said annular inner wall.

2. The apparatus of claim 1 further comprising:
   a second flexure plate having a central axis, said second flexure plate having,
      a central member, and
      a second plurality of spring members having first and second ends, each of said second plurality of spring members extending from said second flexure plate central member with said first ends of said spring members rigidly fixed to said second flexure plate central member;
   means for rigidly securing said laser block between said first and second flexure plates and in which said central axis of said first and second flexure plates are coaxial; and
   means for rigidly securing said second ends of said second plurality of spring members to said annular inner wall.

3. The dither suspension mechanism of claim 1 wherein said laser block includes an aperture in parallel with the input axis of said sensor, and an aperture in said first flexure plate for receiving a stud therethrough.

4. In a laser angular rate sensor having a laser block driven about an axis by a dither suspension mechanism, the dither suspension mechanism comprising:
   a first flexure plate having a central axis, said first flexure plate having,
      an outer toroidal rim concentric with said central axis;
      a central member;
      a plurality of springs extending between said outer toroidal rim and said central member;
   a housing having an aperture for receiving said laser block, said housing aperture being bounded by an annlar inner wall about a central axis therethrough, said aperture capable of receiving said laser block and said first flexure plate;
   means for rigidly securing together said laser block and said central member of said first flexure plate; and
   means for rigidly securing said toroidal rim of said first flexure plate to said annular inner wall.

5. The dither suspension mechanism of claim 4 wherein said laser bock includes an aperture in parallel with the input axis of said sensor, and an aperture in said first flexure plate for receiving a stud therethrough.

6. In a laser angular rate sensor having a laser block driven about an axis by a dither suspension mechanism, the dither suspension mechanism comprising:

first and second flexure plates each having a central axis, each of said flexure plates having,
  an outer toroidal rim concentric with said central axis;
  a central member;
  a plurality of radial springs extending from said central member to said outer toroidal rim;
a housing having an aperture for receiving said laser block, said housing aperture being bounded by an annular inner wall about a central axis therethrough, said aperture capable of receiving said laser block and said first flexure plate;
means for rigidly securing said laser block between said central member of said first and second flexure plates and in which said central axes thereof are coaxial; and
means for rigidly securing said toroidal rim of each of said first and second flexure plates to said annular inner wall.

7. The dither suspension mechanism of claim 6 wherein said laser block includes an aperture in parallel with the input axis of said sensor, and an aperture in each of said first and second flexure plates coaxial with said central axis thereof for receiving a stud therethrough.

8. The dither suspension mechanism of claim 6 including means for flexing said spring to cause circumferential motion of said laser block relative to said housing.

9. A dither suspension mechanism for transmitting circumferential motion about an axis to a driven member, said dither suspension mechanism comprising:

a first flexure plate having a central axis, said first flexure plate having,
  a central member, and
  a plurality of spring members having first and second ends, each of said plurality of spring members extending from said central member with said first ends of said spring members rigidly fixed to said central member;
a housing having an aperture for receiving said driven member, said housing aperture being bounded by an annular inner wall about a central axis therethrough, said aperture capable of receiving said laser block and said first flexure plate;
means for rigidly securing together said driver member and said central member of said first flexure plate;
means for rigidly securing said second ends of said springs to siad annular inner wall; and
electrical transducers rigidly fixed to selected ones of said spring members to cause said springs to flex in response to an electrical signal and cause said circumferential motion.

* * * * *